United States Patent
Nakamura

[11] Patent Number: 5,946,456
[45] Date of Patent: Aug. 31, 1999

[54] IMAGE FORMATION CONTROL DEVICE AND METHOD FOR CHANGING INFORMATION OF IMAGE FORMING MEDIUM

[75] Inventor: Takahiro Nakamura, Kanagawa, Japan

[73] Assignee: Fuji Xerox Co., Ltd., Tokyo, Japan

[21] Appl. No.: 08/824,847

[22] Filed: Mar. 26, 1997

[30] Foreign Application Priority Data

Mar. 27, 1996 [JP] Japan ................................. 8-071831

[51] Int. Cl.⁶ .............................. G06F 15/00; B41J 2/01; B65H 3/44; B65H 1/00
[52] U.S. Cl. ........................ 395/111; 399/389; 347/104; 271/9.06; 271/171
[58] Field of Search .................................... 395/101, 102, 395/111, 112, 113, 115, 116; 399/43, 85, 361, 389; 347/104, 218, 262; 271/9.06, 9.05, 9.01, 171

[56] References Cited

U.S. PATENT DOCUMENTS

| | | | |
|---|---|---|---|
| 5,420,669 | 5/1995 | Imada | 355/208 |
| 5,677,770 | 10/1997 | Ohori | 358/296 |
| 5,678,000 | 10/1997 | Ohtani | 395/102 |

OTHER PUBLICATIONS

"Information technology—Document printing application (DPA)—Part 1: Abstract–service definition and procedures", ISO/IEC JTC1/SC18/WG4 N 3083rev., 1996.

*Primary Examiner*—Edward L. Coles
*Assistant Examiner*—Mark Wallerson
*Attorney, Agent, or Firm*—Finnegan, Henderson, Farabow, Garrett & Dunner, L.L.P.

[57] ABSTRACT

An image formation control device including an information holding unit, an output control unit, an information change unit, and a change control unit. The information holding unit holds the information of an image forming medium stored in a paper feed tray, while the output control unit controls the output of a printer by referring to the information of the image forming medium. The information change unit changes the information of the image forming medium in accordance with an instruction from an operator. Further, the change control unit, when executing the change of the image forming medium information, judges whether the information of the image forming medium to be changed is detectable or not. If it is found detectable, then the change control unit refuses the present change but, if not detectable, then it allows the present change.

4 Claims, 4 Drawing Sheets

IMAGE FORMATION CONTROL DEVICE AND METHOD FOR CHANGING INFORMATION OF IMAGE FORMING MEDIUM

BACKGROUND OF THE INVENTION

1. Field of the Invention

The present invention relates to an image formation control device and a method for changing the information of a medium on which an image is to be formed (which is hereinafter referred to simply as an image forming medium) and, in particular, to an image formation control device for controlling the output of an image forming medium, and to a method for changing the information of an image forming medium used in an image forming device.

2. Description of the Related Art

An image forming device includes a paper feed unit (a paper feed tray), and mediums on which images are formed are stored in the paper feed unit of the image forming device. Then, an image formation control device is used to control the output of the image forming medium in accordance with the information of the image forming medium. Here, the term "image forming device", in particular, means a printing device such as a printer or the like, while the term "image forming medium" means a sheet of paper such as a sheet of ordinary paper, an OHP sheet or the like. Also, the term "information of the image forming medium" means information on the size of the paper or the like, and the term "image formation control device" corresponds to a printer server which controls the printing device.

Generally, a paper feed tray, in which sheets of paper can be stored, includes a paper feed tray of a cassette type that a large number of sheets can be set therein, and a paper feed tray of a manual feed type that a small number of sheets can be set therein.

The sizes of the sheets set in the paper feed tray of a cassette type can be automatically detected by the printer server, whereas the sizes of the sheets set in the paper feed tray of a manual feed type cannot be detected automatically, or, most of the sizes of the sheets set in the paper feed tray of a manual feed type cannot be set as hardware.

Therefore, the sizes of the sheets, which are set in an automatically detectable paper feed tray, can be automatically set in the printer server, whereas the sizes of the sheets, which are set in a paper feed tray incapable of automatic detection, must be set into the printer server by a user.

However, in the above-mentioned printer, there arises an inconvenience if the printer server accepts requests for change of the paper size from a client for all the paper feed trays. That is, if the print sever accepts the paper size change request for the automatically detectable paper feed tray as well, then there is a fear that a wrong paper size given by the client is accepted and thus a correctly set paper size will be changed.

SUMMARY OF THE INVENTION

The present invention aims at eliminating the drawbacks found in the above-mentioned conventional image formation control device. Accordingly, it is an object of the invention to provide an image formation control device which is able to control the paper size information correctly without errors.

It is another object of the invention to provide an image formation control device which includes flag information indicating whether the automatic detection of the paper size information is possible or not.

It is still another object of the invention to provide an image formation control device which can control a printer in accordance with the flag information.

It is yet another object of the invention to provide a method for changing the information of an image forming medium in which the paper size of the printer can be changed without errors.

In attaining the above objects, according to the invention, there is provided an image formation control device for controlling an output of an image forming medium, the image formation control device comprising: information holding means for holding information of an image forming medium stored in a paper feed unit; output control means for controlling an output of the image forming medium by referring to the information of the image forming medium; information change means for changing the information of the image forming medium in accordance with an instruction from an operator; and change control means, when executing the change of the image forming medium information, for judging whether the image forming medium information to be changed is detectable or not and, if it is found detectable, for refusing the change but, if not detectable, for allowing the change.

Also, according to the invention, there is provided a method for changing information of an image forming medium stored in an image forming device, the method comprising the steps of: preparing a table including information of an image forming medium stored in a paper feed unit provided in an image forming device and an automatic detection flag indicating whether the information in automatically detectable or not; setting arguments in the image forming device, the paper feed unit, and the information, respectively; referring to the table and, if there in present the image forming device specified by the argument, referring to an automatic detection flag indicating whether the information corresponding to the paper feed unit is automatically detectable or not; if a value of the automatic detection flag is not automatically detectable, then changing the information specified by the argument; and if there is not present the image forming device specified by the argument, and if the value of the automatic detection flag is automatically detectable, then refusing the change of the information and notifying an operator of an error.

DETAILED DESCRIPTION OF THE PREFERRED EMBODIMENT

Now, description will be given below of the embodiments of an image formation control device and a method for changing the information of an image forming medium used in the image formation control device according to the invention with reference to the accompanying drawings.

Figure 1:
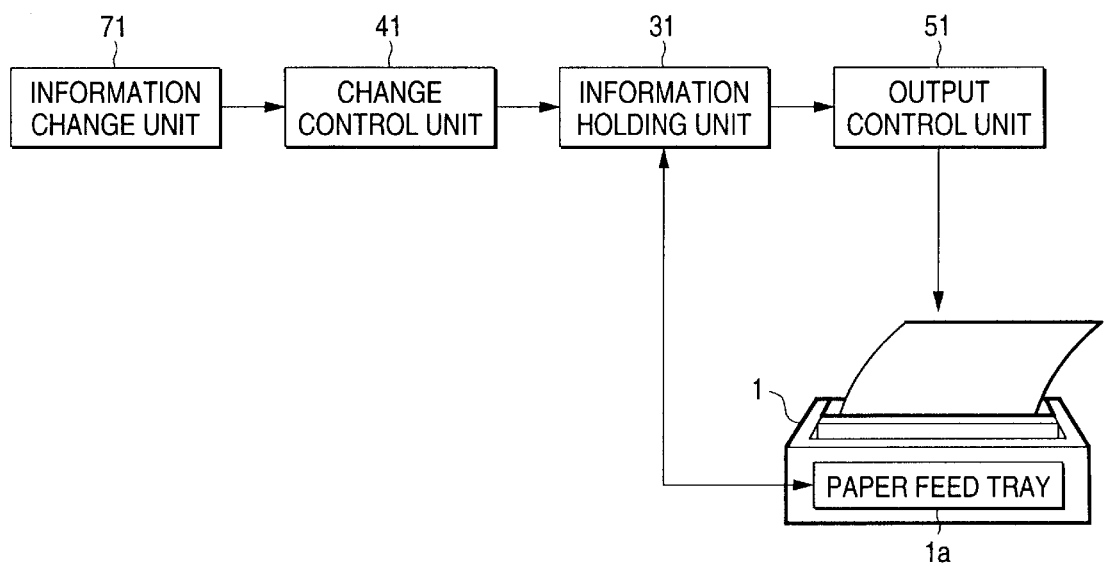
FIG. 1 is a block diagram of an embodiment of an image formation control device according to the invention, illustrating the principles thereof.

FIG. 1 shows the principles of an image formation control device according to the invention. The present image formation control device comprises an information holding unit 31 for holding the information of an image forming medium therein, an output control unit 51 for referring to the above information to thereby control the output of an image forming device, an information change unit 71 for changing the information of the image forming medium, and a change control unit 41 for controlling the change of the image forming medium information.

Next, description will be given below of the respective units of the present image formation control device. The information holding unit 31 is used to hold therein the information of an image forming medium stored in a paper feed tray 1a of a printer 1 which is an example of the image forming device. Here, the term "image forming medium" means a sheet of paper which includes an ordinary sheet of paper or an OHP sheet. The information to be held in the information holding unit 31 is information on the paper size or the like.

Also, the output control unit 51 is used to control the output of the printer 1 in accordance with the information held in the information holding unit 31.

Further, the information change unit 71 is used to change the information on the paper size or the like set in the paper feed tray 1a in accordance with an instruction given by a user.

Still further, the change control unit 41, when the user changes the information that has been already set, judges whether the information to be set is detectable or not; and, if the information is found detectable, then the change of the user is refused but, if not, then the change is accepted. That is, in the case of the automatically detectable information, it is not necessary to accept any request for change of information and thus the request for change is refused, and, the change control unit 41 informs the user of that effect.

Figure 2:
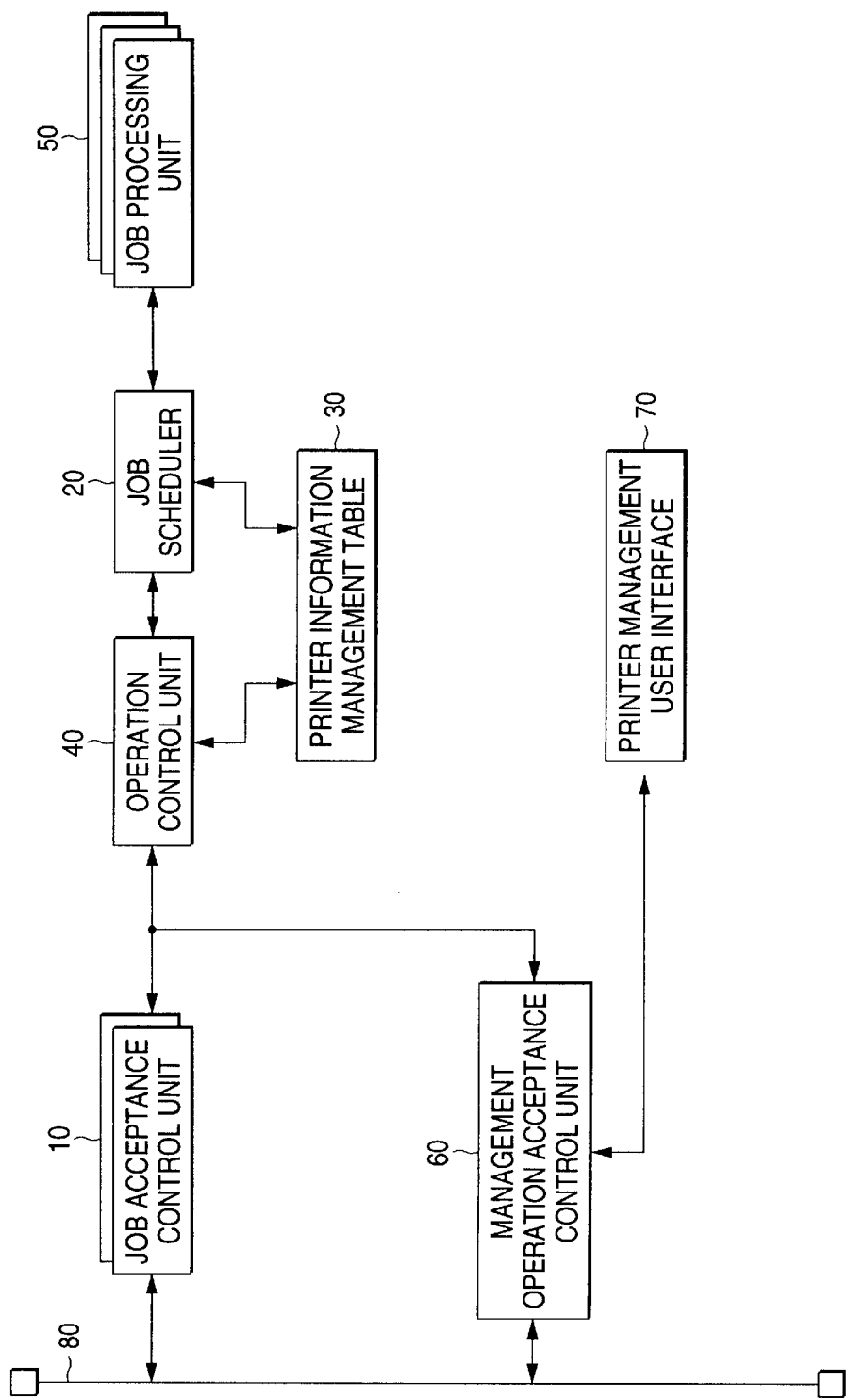
FIG. 2 is a block diagram of a printer server to which the invention is applied, illustrating the principles thereof.

Next, description will be given below in detail of a printer server to which the present invention is applied. Here, FIG. 2 shown the principles of the printer server to which the present invention is applied. The present printer server comprises a job acceptance control unit 10 which accepts a request for processing of a job from a network 80, a job scheduler 20 which allocates a job corresponding to a scheduling policy, a printer information management table 30 which manages a table of printer information, an operation control unit 40 which controls a change operation such as a printer information change request or the like, a job processing unit 50 which executes the processing of the job allocated, a management operation acceptance control unit 60 which accepts a request for change of the printer information from a user, and a printer management user interface 70 which is interfaced with the user on the printer information.

In operation, if the job acceptance control unit 10 normally accepts a job input therein through the network 80, then it converts the job into a common format which is used in the next stage, that is, the operation control unit 40. That is, since the jobs are transmitted in various kinds of different formats, it is necessary to unify them into the format that is specified by the present printer server. Therefore, the format of the printer server is composed of a plurality of formats so that it is possible to cope with various jobs transmitted to the printer server.

The job scheduler 20 controls the status of the job processing unit 50 all the time and allocates the job processing unit 50 a job which corresponds to a previously set scheduling policy. As the scheduling policy, there can be used a priority incidental to a job, an FIFO, a large job priority, or the like.

The printer information management table 30 has a plurality of information fields respectively corresponding to paper feed trays provided in the printer, and each of the information fields includes the paper size that can be fed currently, and the automatic detection flag indicating whether the associated paper feed tray is able to automatically detect the size of the paper set therein or not. A concrete example of the printer information management table 30 will be discussed later.

The operation control unit 40 receives from the user a change operation relating to the request for change of the printer information or a request for processing of a job and, in accordance with the printer information management table 30, executes a processing corresponding to the operation requested.

For example, when a processing for a job is requested, the operation control unit 40 refers to the printer information management table 30 to confirm as to whether no conflicts, for instance, "a specified printer is not able to process a document format", are found in job characteristic parameters.

That is, after it confirms that no conflicts are found, the operation control unit 40 registers the present job in the job scheduler 20 as a job.

Also, when the operation control unit 40 receives a change request for the paper size as a request for the printer information from the user, the control unit 40 judges from the automatic detection flag whether the present paper size change is allowable or not and, if it is found allowable, then the control unit 40 changes the information of the printer information management table 30.

The job processing unit 50 processes the job actually and, after then, outputs the result of the processing. The processing to be executed by the job processing unit 50 includes a change of the document format, an image processing, a notifying processing and the like. The output of the job processing unit 50 is recorded into an output medium or redirected. Here, referring to an instruction for execution given from the job scheduler 20 to the job processing unit 50, the number of the execution instructions depends on the contents of the jobs, that is, the number is not limited to one but a necessary number of the execution instructions are repeated. Also, the term "redirect" means to transfer a job to another job processing unit when the job cannot be processed within a single job processing unit or when the execution of the corresponding job cannot be carried out.

The management operation acceptance control unit 60 accepts a change operation or the like from the user and requests a processing on management and control to the operation control unit 40.

The printer management user interface 70 can be interfaced with the user as to inquiries about the printer information, updating of the printer information, whether a printer is usable or not, and the like.

Also, when, as the printer information relating to the change of the paper size, the printer number p, tray number t, and paper size a (p, t and s are arguments of the operation) are specified by the user, the printer management user interface 70 transmits these pieces of printer information to the management operation acceptance control unit 60 as the paper size change requests.

Further, while the printer management user interface 70 is locally connected to the management operation acceptance control unit 60 in FIG. 2, the interface 70 may be connected remotely thereto through the network 80.

Figure 3:
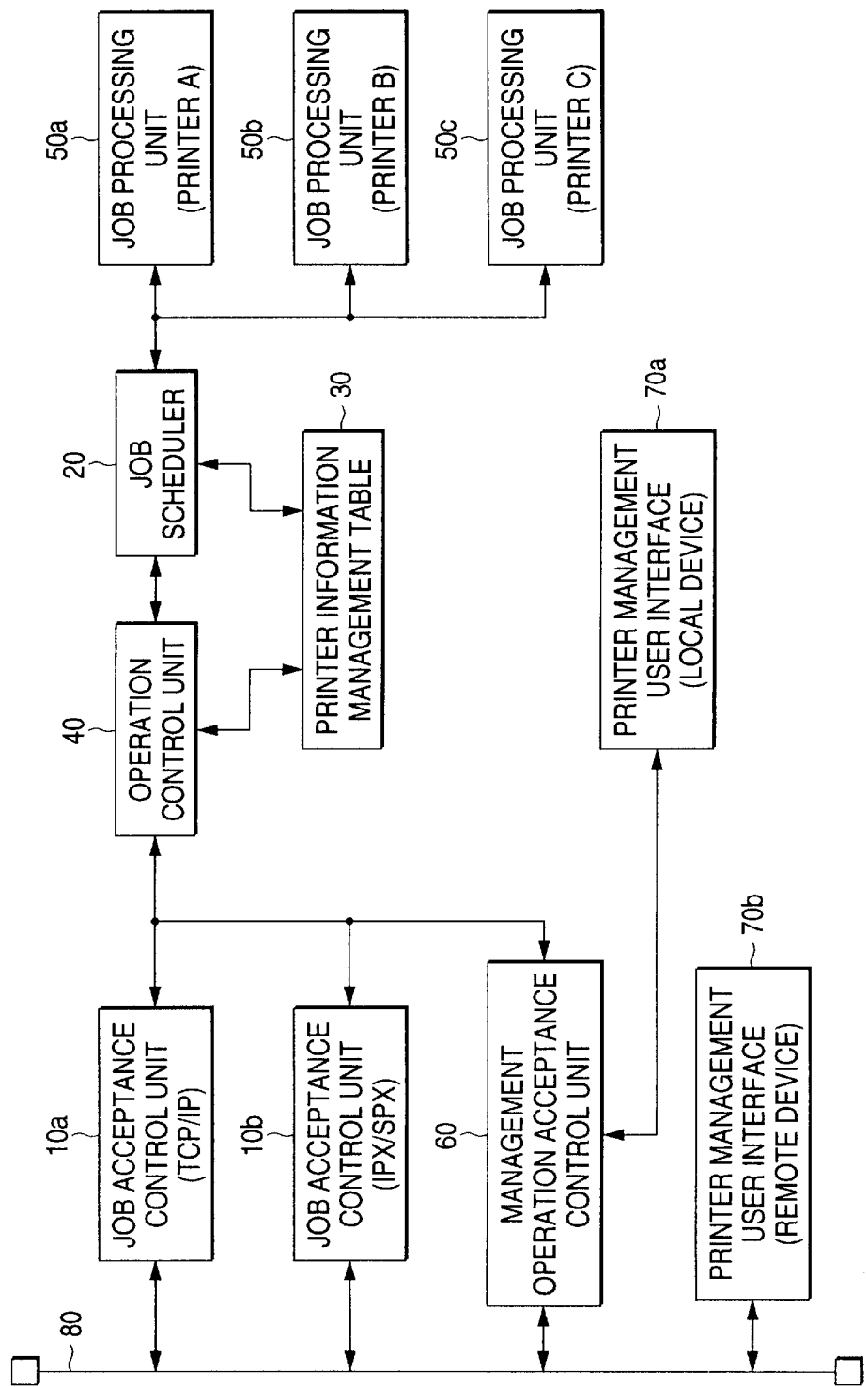
FIG. 3 is a block diagram of the whole of the printer server to which the invention is applied, including the main portions thereof.

Next, description will be given below in more detail of the structure and operation of the printer server to which the present invention is applied. FIG. 3 is a block diagram of the whole of the printer control device including the main portions thereof. The printer control device comprises two job acceptance control unit 10a and 10b which are respectively used to accept a request for processing of a job from the network 80, a job scheduler 20 which is used to allocate a job corresponding to a scheduling policy, a printer information management table 30 used to manage a table of printer information, an operation control unit 40 used to control an operation such as a printer information change request or the like, three job processing units 50a, 50b and 50c which are respectively used to execute processings of the jobs allocated, a management operation acceptance control unit 60 for accepting a request for change of the printer information from a user, and two printer management user interfaces 70a and 70b which are respectively interfaced with the user relating to the printer information.

The job acceptance control units 10a and 10b respectively operate in accordance with various network protocols, that is, they control the acceptance of job processing requests from the network. For example, the job acceptance control unit 10a controls the acceptance of the job that corresponds to the job format of the TCP/IP (Transmission Control Protocol/Internet Protocol), as the network protocol.

On the other hand, the job acceptance control unit 10b controls the acceptance of the job that corresponds to the job format of the IPX/SPX (Internet Packet Exchange/Sequenced Packet Exchange), as the network protocol.

The three job processing units 50a, 50b and 50c show that they are respectively connected to three printer devices A, B and C. That is, they respectively process the jobs that correspond to their respective printers.

The printer management user interfaces 70a and 70b are connected locally or remotely. In FIG. 3, the printer management user interface 70a is locally connected to the management operation acceptance control unit 60, whereas the printer management user interface 70b is remotely connected thereto through the network 80.

Figures 4, 5:
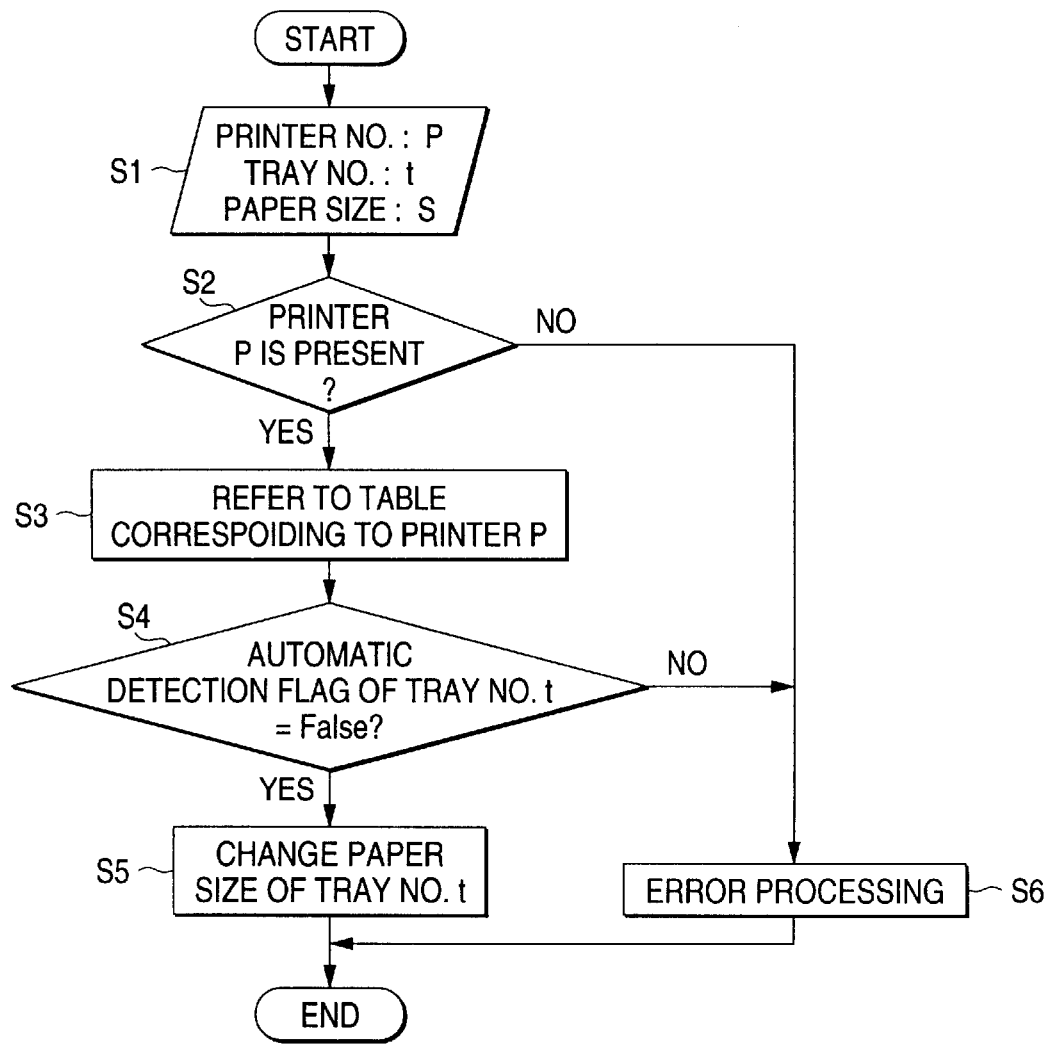
FIG. 4 is a table of printer information.
FIG. 5 is a flow chart of the whole of the processings to be executed by a method for changing the information of an image forming medium according to the invention.

Now, FIG. 4 is a table of printer information. Such a table, which corresponds to the printer connected to the printer server, is held within the printer information management table 30. The table is composed of printer information such as a paper feed tray 30a belonging to the printer, a paper size 30b, an automatic detection flag 30c of the size of the paper to be set in the paper feed tray, and the like.

In FIG. 4, the paper feed tray 30a is set to be a tray A, the paper size 30b of the tray A is set to be A3, and the automatic detection flag is set to be "False". The term "False" means that automatic detection is impossible.

Similarly, the paper feed tray 30a is set to be a tray B, the paper size 30b of the tray B is set to be A4, and the automatic detection flag is set to be "True". The term "True" means that automatic detection is possible.

Also, the automatic detection flag 30c is set when the printer is installed onto the present printer server. The value of the paper size 30b is changed each time when the printer notifies a change event of the paper size. Here, when the change of the paper size cannot be detected automatically by the printer, a change operation from the user is allowed. Therefore, in this case, the user changes the value of the paper size by means of the change operation. On the other hand, when the change of the paper size can be detected automatically, the change operation from the user is not allowed but refused.

This information table is stored in accordance with the information that is notified from the job processing units 50a, 50b and 50c to the job scheduler 20 when the job processing units 50a, 50b and 50c are respectively initialized.

Next, description will be given below of the whole processing procedures to be taken in the present method for changing the information of the image forming medium. Here, it is assumed that the change of the paper size is carried out as the change of the image forming medium information. Now, FIG. 5 is a flow chart of the whole processing procedures of the paper size changing method.

The arguments of the operation, p, t, and s are respectively set in the printer No., tray No., and paper size (Step S1).

It is checked whether the printer p is present or not (Step S2). If present, then the processing goes to Step S3 and, if not, then the processing goes to Step S6.

A table which corresponds to the printer p is referred to (Step S3). This table has information fields respectively corresponding to the paper feed trays of the printer, and each of the information fields includes the paper size that can be fed currently, and the automatic detection flag indicating whether the associated paper feed tray is able to automatically detect the size of the paper set therein or not.

It is checked whether an automatic flag of a tray No. t is False or not (Step S4). If False, then the processing goes to Step S5 and, if True, then the processing goes to Step S6.

A change operation from a user is accepted and the paper size of the tray No. t is changed (Step S5).

As an error processing, the user is notified of an error that the user's change operation cannot be accepted (Step S6).

As described above, the automatic detection flags are provided for the paper feed trays one for one, whereby the acceptance of the paper size change operation can be controlled. Due to this structure, even when the paper feed trays capable of automatically detecting the paper sizes are intermingled with the paper feed trays incapable of such detection, the information on the usable paper sizes can be managed being free from errors.

Also, even when a printer capable of automatically detecting the paper size is connected with a printer incapable of such detection, the information on the usable paper sizes can be managed being free from errors.

Although the image forming device is assumed to be a printer in the foregoing description, the present invention can also be applied similarly to an image forming device such as a facsimile device or the like.

As has been described heretofore, the image formation control device according to the invention is structured such that it can refuse the change of the detectable information. Due to this structure, when the paper size is to be changed, the paper size information can be changed with no possibility of wrong information being set.

Further, in the method for changing the information of an image forming medium according to the invention, the change control of the paper size information can be executed by referring to the automatic detection flags respectively set for paper feed trays one for one. Due to this, setting of a wrong paper size by a user can be avoided automatically, go that the paper size information can be managed with accuracy.

What is claimed is:

1. An image formation control device for controlling an output of an image forming medium, said image formation control device comprising:

information holding means for holding information of an image forming medium stored in a paper feed unit;

output control means for controlling an output of the image forming medium by referring to the information of the image forming medium;

information change means for changing the information of the image forming medium in accordance with an instruction from an operator; and change control means, when executing the change of the image forming medium information, for judging whether the image forming medium information to be changed is detectable or not and, if it is found detectable, for refusing the change but, if not detectable, for allowing the change.

2. The image formation control device as set forth in claim 1, wherein said information holding means holds flag information indicating whether the image forming medium information is detectable or not in correspondence to the image forming medium.

3. The image formation control device as set forth in claim 2, wherein said change control means judges by referring to the flag information whether the image forming medium information to be changed in detectable or not.

4. A method for changing information of an image forming medium stored in an image forming device, said method comprising the steps of:

preparing a table including information of an image forming medium stored in a paper feed unit provided in an image forming device and an automatic detection flag indicating whether said information is automatically detectable or not;

a setting arguments in said image forming device, said paper feed unit, and said information, respectively;

referring to said table and, if there is present said image forming device specified by said argument, referring to an automatic detection flag indicating whether said information corresponding to said paper feed unit is automatically detectable or not;

if a value of said automatic detection flag is not automatically detectable, then changing said information specified by said argument; and if there is not present said image forming device specified by said argument, and if the value of said automatic detection flag is automatically detectable, then refusing the change of said information and notifying an operator of an error.

* * * * *

UNITED STATES PATENT AND TRADEMARK OFFICE
CERTIFICATE OF CORRECTION

PATENT NO. : 5,946,456
DATED : August 31, 1999
INVENTOR(S) : Takahiro NAKAMURA

It is certified that error appears in the above-identified patent and that said Letters Patent is hereby corrected as shown below:

Claim 4, column 8, line 5, before "setting", delete "a".

Signed and Sealed this

Nineteenth Day of September, 2000

Attest:

Q. TODD DICKINSON

*Attesting Officer*   *Director of Patents and Trademarks*